J. W. FOUST.
Hay Rake and Loader.
No. 58,804.
2 Sheets—Sheet 1.
Patented Oct. 16, 1866.
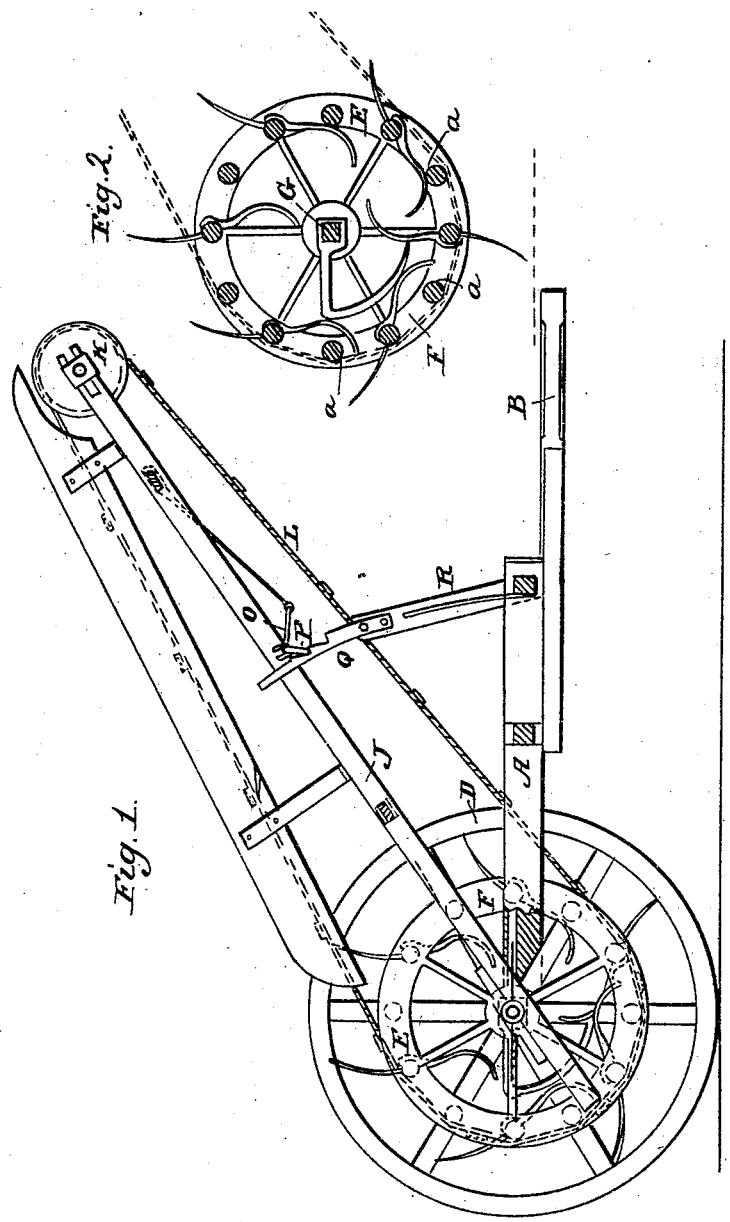

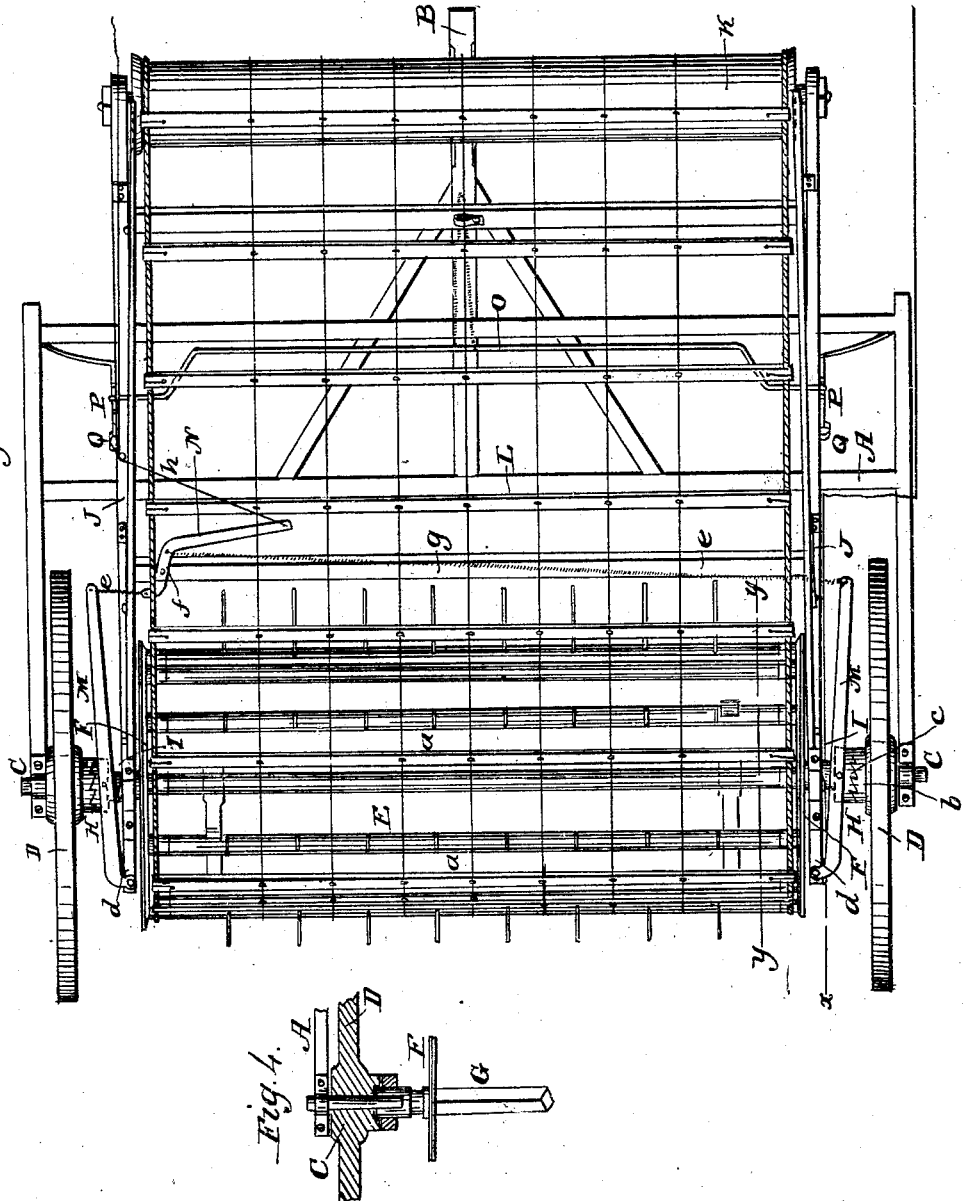

UNITED STATES PATENT OFFICE.

J. W. FOUST, OF EVANSBURG, PENNSYLVANIA.

IMPROVEMENT IN HAY RAKERS AND LOADERS.

Specification forming part of Letters Patent No. 58,804, dated October 16, 1866.

*To all whom it may concern:*

Be it known that I, J. W. FOUST, of Evansburg, in the county of Crawford and State of Pennsylvania, have invented a new and Improved Machine for Loading Hay; and I do hereby declare that the following is a full, clear, and exact description thereof, which will enable those skilled in the art to make and use the same, reference being had to the accompanying drawings, forming part of this specification, in which—

Figure 1, Sheet No. 1, is a side sectional view of my invention, taken in the line $x\,x$, Fig. 3; Fig. 2, a side sectional view of a reel pertaining to the same, taken in the line $y\,y$, Fig. 3; Fig. 3, Sheet No. 2, a plan or top view of my invention; Fig. 4, a horizontal section of one of the driving-wheels and its clutch, by which the reel is thrown in and out of gear.

Similar letters of reference indicate corresponding parts.

This invention relates to an improvement on a hay-loading machine for which Letters Patent were granted to me bearing date November 18, 1862.

The present invention and improvement consist in a means for rendering the hay-carrier operative and inoperative when desired.

A represents a rectangular frame, which has a draft-pole, B, attached to it and two arms or axles, C C, at its rear, one at each side, on which wheels D D are placed and allowed to rotate freely.

E represents a reel or drum composed of slats $a$, the ends of which are fitted in circular heads F F, placed on a shaft, G, into the ends of which the axles C C are fitted.

The wheels D D are connected to the shaft G of the reel or drum by means of clutches H, one part, $b$, of which is on the wheels D, and the other part, $c$, placed on the shaft G, the parts $c$ being allowed to slide on the shaft, but connected thereto by feathers and grooves, so as to turn at all times with the shaft.

The parts $c$ have spiral springs I bearing against them, which springs have a tendency to keep the parts $c$ in contact with the parts $b$ and cause the reel or drum to be rotated as the machine is drawn along.

J J represent two bars, which are fitted loosely on the shaft G, and are connected at their outer ends by a drum, K, over which and the reel or drum E an endless carrier, L, passes, which carries up the hay and deposits it upon the load on the wagon in the same way as described in my previous Letters Patent, the reel or drum being provided with teeth, which, as said reel or drum rotates, gather up the hay and place it on the carrier, as in the original machine.

The sliding parts $c$ of the clutches have levers M attached to them, the fulcra $d$ of which are at the rear of the bars J J. The front ends of these levers M M are connected by wires $e\,e$ to a bent lever, N, the fulcrum $f$ of which is on a cross-bar, $g$, of the bars J J, said lever having a cord, $h$, attached to it, which may extend to the wagon to be loaded, so that the persons on the wagon or load may operate the same, and disconnect the wheels D D from the shaft G when required.

O represents a bail-shaped shaft, the bearings of which are attached to the bars J J. The ends of the shaft O are bent to form pawls P P, which engage with toothed segment-racks Q Q, attached to uprights R R on the frame A. By means of these pawls and racks the bars J J, and consequently the endless carrier, may be set to any degree of inclination required, or raised to correspond to the gradually increasing height of the load on the cart or wagon.

By the within-described arrangement of the clutches and the wheels on which the machine is mounted the endless carrier may be rendered operative and inoperative when desired, and with the greatest facility, and the endless carrier also adjusted to conform to the gradually increasing height of the load without any trouble whatever.

Having thus described my invention, I claim as new and desire to secure by Letters Patent—

The arrangement of the clutches H with the wheels D D and shaft G of the reel or drum E, in connection with the levers M attached to the lever N, and all arranged to operate in the manner substantially as and for the purpose set forth.

J. W. FOUST.

Witnesses:
JOHN GILLIS,
CHAS. STRATTON.